United States Patent Office 3,512,571
Patented May 19, 1970

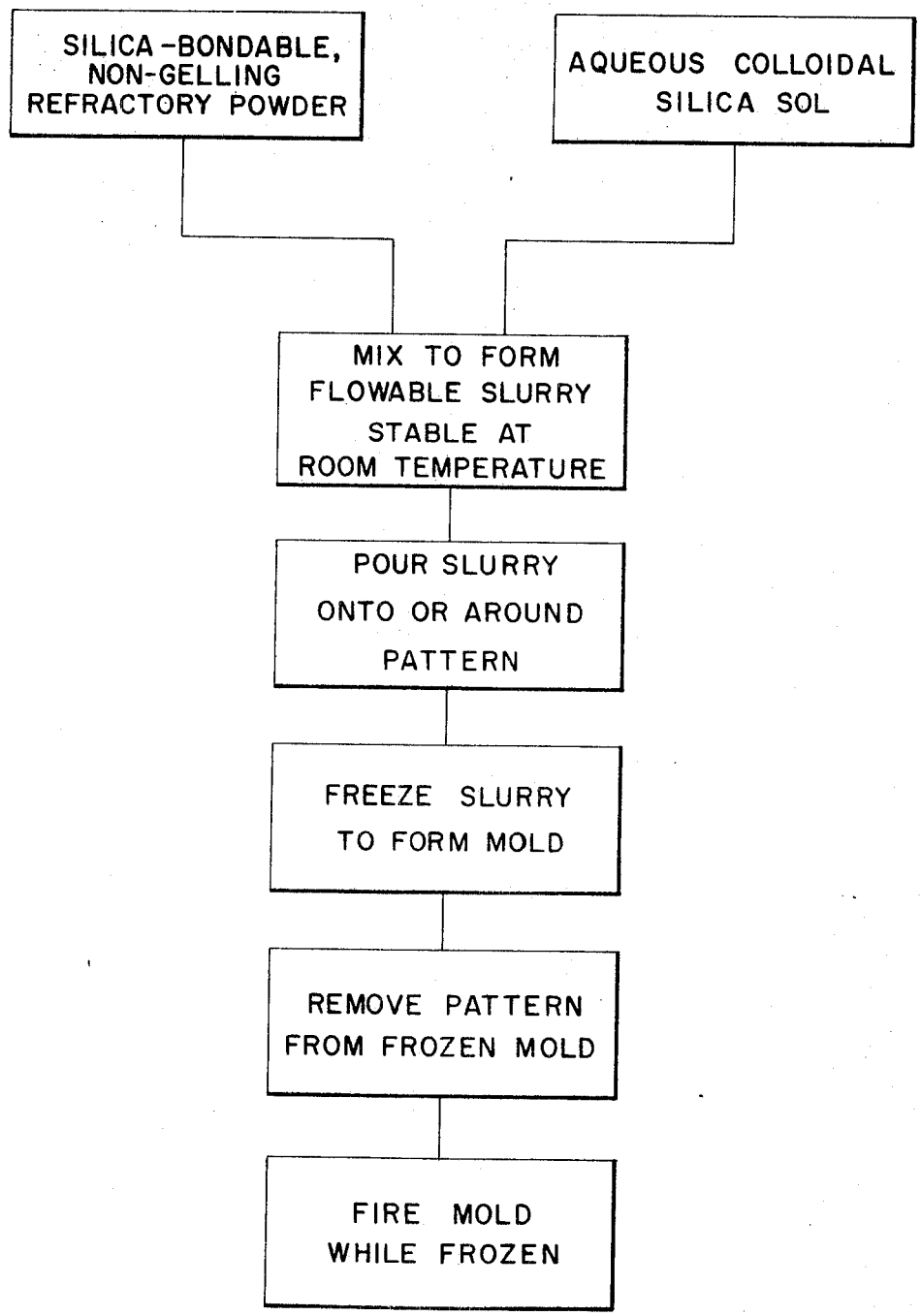

---

3,512,571
CRYOGENIC FORMATION OF REFRACTORY MOLDS AND OTHER FOUNDRY ARTICLES
Edwin H. Phelps, Birmingham, Ala., assignor to American Cast Iron Pipe Company, Birmingham, Ala., a corporation of Georgia
Filed Apr. 12, 1968, Ser. No. 720,946
Int. Cl. B22c 1/00
U.S. Cl. 164—37    11 Claims

ABSTRACT OF THE DISCLOSURE

A simple, rapid method of forming investment molds and other refractory foundry articles comprises the step of freezing a slurry of freeze-sensitive aqueous colloidal silica sol and powdered refractory while in contact with a pattern. To form a ceramic shell, the slurry is frozen on the pattern to the desired thickness, after which the unfrozen portion may be poured off and reused. The frozen mold or other shape may be fired immediately, without thawing or drying. Refractory articles formed by this method are highly resistant to thermal shock, and provide excellent reproducible detail and dimensional accuracy, with thicknesses ranging from ⅛ inch to several inches.

BACKGROUND OF THE INVENTION

This invention relates to the formation of investment molds and other refractory articles for foundry use, and more particularly to an improved and simplified method for producing such molds and other shapes from slurries containing powdered refractory material and a binder.

Prior to the present invention, a number of different methods have been proposed for forming investment molds utilizing mixtures of comminuted refractory materials and binders such as sodium silicate, ethyl silicate and colloidal silica sols, but most of these processes require closely controlled additions of various chemicals to bring about gelling of the binder. Examples of such methods are disclosed in Shaw Pat. Nos. 2,795,022 and 2,811,760. Similar procedures involving special techniques for minimizing cracking of the molds, and for increasing the permeability thereof, are described in such patents as Collins No. 2,380,945, Herzmark et al. No. 2,945,273 and Carter No. 2,948,935.

Various methods of making refractory or ceramic castings or molds involving a freezing step have also been proposed in such patents as Nesbit No. 2,765,512 and Smith No. 2,869,215. However, these methods do not use silicate or colloidal silica binders, and require the removal of water prior to freezing, and careful thawing or drying procedures after freezing, to prevent cracking.

The patent to Smith-Johannsen No. 3,177,161 discloses a process of forming ceramic bodies which includes the freezing of a mixture containing an aqueous colloidal silica sol, but the other constituent of the mixture is an inorganic laminar or flake-like material, such as mica, graphite, clay, molybdenum sulfide or powdered metal, particularly zinc. Contrary to the objectives of the present invention, the Smith-Johannsen process requires thawing of the frozen body of slurry at room temperature, removal of water and drying.

SUMMARY OF THE INVENTION

The present invention is a novel, simple and rapid method of preparing refractory molds and other articles for foundry use, including ladle linings, pouring orifices and tubes, which avoids the complicated mixing, thawing, and drying procedures of the prior art, and the necessity for using special materials and additives to form the finished article. In its simplest form, the invention resides in the formation of a refractory mold or other shape by freezing on a pattern a slurry consisting of a freeze-sensitive aqueous colloidal silica sol and a powdered refractory material, separating the frozen shape and the pattern, and then firing the frozen shape without prior thawing or drying.

The slurry has only two constituents, an aqueous colloidal silica sol and a refractory powder which is bondable by, but does not cause gelling of the silica sol, and which forms a stable slurry at room temperature. Although the exact ratio of the two materials forming the slurry is not critical, the slurry mixture preferably contains from 30% to 80% refractory powder having a particle size not greater than 200 mesh, the remainder being a colloidal silica sol containing from 30% to 50% silica.

The slurry may be frozen while in contact with the pattern using various techniques and any suitable refrigerant, the temperature of which is not critical as long as it is low enough to produce a frozen body of slurry having a thickness ranging from ⅛ inch to several inches in a period of from one minute to 20 minutes. In addition to the usual metal and wooden foundry patterns, wax, plastic and frozen mercury patterns may be used. Due to the irreversible precipitation of silica when a colloidal silica sol is frozen, the frozen shape bonded by the precipitated silica has excellent resistance to cracking, and because it may be fired immediately, very fast and easily controlled production rates are possible.

Molds and other refractory articles produced by the method of the present invention retain close dimensional accuracy while undergoing the change from frozen to fired or ceramic state, are very hard, expand very little when heated, are highly resistant to thermal shock, and provide excellent reproducible detail.

BRIEF DESCRIPTION OF THE DRAWING

The drawing is a schematic representation of the steps of a preferred embodiment of the method of the present invention.

DESCRIPTION OF THE PREFERRED EMBODIMENTS

As indicated in the drawing, a preferred embodiment of the invention is a method of forming a refractory mold which comprises the following steps: (1) suitable quantities of an aqueous colloidal silica sol and a powdered refractory material which is bondable by, but does not cause gelling of, the silica sol are mixed together to form a flowable slurry which is stable at room temperature; (2) a pattern of the mold to be formed is placed in a flask or other suitable container and the slurry is poured onto or around the pattern; (3) the flask is then placed in a freezing bath or a freezer until the body of slurry is frozen to form the mold; (4) the pattern is then stripped or otherwise removed from the frozen mold; and (5) the mold is fired while still frozen. The term "firing" is used herein in its usual sense in the ceramic art to denote exposure of a body containing refractory material to an intense heat, at temperatures substantially higher than ordinary drying temperatures, in order to harden the body and remove therefrom all traces of potential gas forming materials.

With reference to step (1), although any finely divided refractory material which may be bonded by the colloidal silica sol, but does not cause a gelling action thereof, may be used in this method, provided it forms a stable slurry at room temperature, best results have been obtained when using zircon, chromite or fused silica flour having a particle size not greater than 200 mesh, in amounts varying from 30% to 80% by weight of the slurry, the remainder being colloidal silica. Other common refractories which may be use are mullite alumina, silica and chromite spinel. Since it has been found that the tensile strength of molds produced in accordance with the invention is affected by the silica content of the colloidal silica sol used in the slurry, the preferred sols are those which are ammonia or sodium stabilized and contain from 30% to 50% $SiO_2$. Although the exact proportions of the two ingredients of the slurry are not critical, it has also been found that the tensile strength of the mold increases with an increase in the percentage of refractory powder in the slurry. For example, slurries containing from 50% to 60% of fused silica flour and 40% to 50% of 49% colloidal silica sol flow well and have adequate strength for most molds. If greater strength is needed, it can be obtained by using up to 75% zircon or chromite flour, instead of the fused silica flour.

The mixing operation may be performed in a paddle or a motor driven propeller type mixer; and since the refractory powders are easily wet by the colloidal silica, a smooth flowable slurry may be quickly produced. After mixing, the slurry may be allowed to stand for a few minutes to remove the entrapped air, or the air may be removed by vibration or vacuuming.

In step (2), the pattern is commonly made of steel, the surface of which should be smooth and lubricated with such lubricants as wax, silicone oil or a fluorocarbon spray before the slurry is poured. However, aluminum is the preferred pattern material for maximum production. Wooden, wax, plastic and frozen mercury patterns may also be used. If the slurry is poured onto a cold pattern, the slurry should flow over the pattern smoothly and quickly, and care should be taken to avoid laps.

If it is not convenient to perform the freezing step (3) in a quick freezer, the flask with the contained pattern and slurry may be placed in an alcohol-Dry Ice bath having a temperature in the range of from —30° F. to —90° F. Other freezing media which have been used include Dry Ice in block form and calcium chloride-ice and acetone-Dry Ice baths, the acetone-Dry Ice bath providing the lowest temperature. Best results have been obtained with the colder baths. In this connection, it has been found that both the rate of freezing and the time the mold remains frozen have a bearing on the strength of the mold, a slow freeze frequently resulting in cracking during the freezing operation, while if the mold is not frozen for a sufficient time, it may melt when fired. In most instances, freezing times ranging from one minute to 20 minutes, utilizing bath temperatures from —50° to —70° F. and slurry temperatures varying from 42° F. to 80° F. are adequate for freezing molds having thicknesses between ⅛ inch and 4 inches. When using a quick freezer, the temperature in the freezer is not critical as long as it is low enough to permit reasonable production rates.

To illustrate the relationship between the thickness of the mold, the time required to freeze it and the freezing temperature, a slurry containing 75% zircon flour and 25% colloidal silica sol containing 49% $SiO_2$ was prepared, poured into aluminum tubes of various diameters, and frozen in an alcohol bath, with the following results:

| Diameter of sample (in.) | Freezing Time (min.) | Slurry temperature °F. | Bath temperature °F. |
| --- | --- | --- | --- |
| 2 | ½ | 80 | —70 |
| 2 | 5⅔ | 80 | —50 |
| 2 | 4½ | 42 | —65 |
| 2⅜ | 7 | 80 | —70 |
| 2⅜ | 7 | 50 | —70 |
| 4 | 20 | 80 | —70 |

As indicated above, the initial freezing is faster with a lower slurry temperature, but as the thickness of the frozen body is increased, the importance of slurry temperature is reduced.

Closely related to the rate and time of freeze is the direction of freeze; for best results, the mold should have unidirectional solidification, it having been found that a mold frozen from both sides, or from top and bottom, tends to have a weak plane in the center and may crack due to internal expansion during freezing. If the mold is jarred or moved after solidification has started, but not completed, a parting line may be formed which will tend to cause separation or cracking upon firing or casting.

In step (4), after the frozen mold has been formed, the pattern is stripped, or, if the pattern is of the expendable type, is removed from the mold in any suitable manner, as by burning, melting or dissolving. When a wax or plastic expendable pattern is removed by melting, it is necessary to direct heat on the pattern to melt it before the outside of the frozen mold thaws in order to avoid cracking of the mold by the expanding pattern material. If an expendable pattern is melted in an oven, the mold will be cracked.

In step (5), the frozen mold is fired immediately after removal of the pattern at a temperature of from 1400° F. to 1600° F. for a period of from 1 to 2 hours, whereupon the finished mold is ready for casting.

The mold thus produced is permeable, but without adverse effect on the reproduction of detail, is highly resistant to thermal shock, and, since it expands very little upon heating, provides a high dimensional accuracy of the castings formed therein Molds prepared by this method have been used for casting gray and ductile iron, aluminum, bronze, and various grades of carbon and alloy steels, and have produced castings with intricate detail and thin sections, as well as castings having thicknesses of two or more inches. Because of the excellent detail, finish and dimensional accuracy of castings made in molds so produced, little or no machining of the castings is required.

In order to illustrate the high strength of refractory molds produced in accordance with the method of the present invention, a number of samples were prepared by pouring equal amounts of fused silica-colloidal silica slurries into a steel tensile sample mold which was placed on a block or Dry Ice for a period of 5 minutes The frozen samples were stripped from the mold and immediately fired in a furnace at 1600° F. for 2 hours In each case, the fused silica powder was mixed with a 49% colloidal silica sol. When the fired samples were tested, their tensile strengths were as follows:

| Percent fused silica in 49% silica sol | Tensile strength (p.s.i.) |
| --- | --- |
| 68 | 318 |
| 63 | 289 |
| 59 | 253 |
| 56 | 220 |
| 50 | 174 |
| 33 | 40 |

When 63% of fused silica flour was mixed with a 30% silica sol, the resulting sample had a tensile strength of 165 p.s.i. On the other hand, when slurries containing 75% zircon and 75% chromite flour mixed with a 49% colloidal silica sol were used to form frozen and fired samples, their tensile strengths were 316 p.s.i. in the case of the zircon slurry, and 554 p.s.i. in the case of the chromite mix.

Although the embodiment of the invention above described relates to the production of a refractory mold, the method is also useful in the production of other types of refractory foundry articles, including refractory tubes, pouring orifices, shell molds and cores, and ladle linings.

For example, ceramic tubes have been made by filling a metal tube with a fused silica-colloidal silica slurry, placing the metal mold in an alcohol-Dry Ice bath, freezing the desired thickness of slurry, and pouring off the unfrozen portion which may be used later. Tubes having a wall thickness from ⅛ inch to ½ inch have been obtained in less than 3 minutes freezing time, and after firing have shown excellent thermal-shock properties when used for plunging Teflon into stainless steel.

In another application of the method, a zircon-colloidal silica slurry was poured around a styrene pattern fixed in a steel pouring box, and the assembly was placed in an alcohol-Dry Ice bath until the slurry was frozen The pattern was then burned out and the orifice was fired with a gas-air torch, the total time for freezing and firing being 1½ hours.

A head core for use in producing cast iron pipe joints was made by filling a metal core box with a fused silica-colloidal silica slurry, freezing a ½ inch shell on the box, stripping the core, and firing it immediately at a temperature of 1400° F. The detail and strength of the finished core were good, and no cracks developed either before or after firing.

A zircon lining has been formed in a hand ladle by freezing a shell of xircon-colloidal silica slurry in the ladle, pouring out the excess slurry, and firing the frozen shell immediately. The ladle lining thus produced proved to be superior to conventional linings in that it did not crack or spall, and slag did not stick to it.

Shell molds may be formed rapidly by pouring a refractory-colloidal silica slurry (precooled if desired) over a cold or refrigerated pattern, permitting a layer of slurry of the desired thickness to freeze on the pattern, pouring off the unfrozen portion of the slurry, and firing the frozen shell.

One of the important advantages of the method of the present invention is that, due to their unusually high resistance to thermal shock, the frozen molds or other articles formed as above described may be fired immediately without prior thawing or drying, thereby making the method well suited to the rapid production of many different refractory shapes. However, it is not essential that the frozen mold or other article be fired immediately, as long as it is oven dried or torched before thawing. For example, if it is desired to form an assembly of molds produced individually from the same pattern, each individual mold may be oven dried at a temperature of from 200° F. to 500° F. after the pattern is pulled, and then, after all of the individual molds have been dried, they may be bonded together with a portion of the same slurry mix as that used to form the molds The completed assembly may then be fired.

There is thus provided by the present invention an extremely simple method for the rapid production of refractory molds and other foundry articles which requires no complicated mixing drying or thawing procedures, and utilizes only two materials in the slurry, a refractory powder and a colloidal silica sol, without the need for closely controlled additions of chemical gelling agents. Since the slurry does not solidify until it is frozen, any portion that does not freeze may be reused. The method is substantially faster than the processes heretofore used, and is versatile in that it is equally usable for the production of small precision castings and large steel castings.

The molds and other refractory articles produced in accordance with the invention differ from those prepared by other methods in that the freezing of the slurry precipitates the silica of the colloidal sol so as to retain the shape imparted by the pattern, while the ice crystals which are formed during freezing produce small voids serving as vents, which, however, are not visible on the castings made in the molds.

I claim:

1. A method of making a refractory article for foundry use comprising the steps of forming a flowable slurry consisting of a freeze-sensitive aqueous colloidal silica sol and a powdered refractory material, bringing the slurry into contact with a pattern having a surface of predetermined shape, freezing at least that portion of said slurry which is in contact with said surface into a frozen body, removing the pattern from the frozen body, and firing the still frozen body without submission to thawing conditions, to produce a refractory article having a surface of said predetermined shape.

2. A method as claimed in claim 1 wherein the slurry contains from 30% to 80% by weight of a refractory material having a particle size not greater than 200 mesh, the remainder being a colloidal silica sol containing from 30% to 50% silica.

3. A method as claimed in claim 2 wherein the refractory material is selected from the group consisting of chromite, zircon and fused silica.

4. A method as claimed in claim 1 wherein the slurry is frozen by subjecting it to a temperature of from —30° F. to —90° F. for a period of from 1 minute to 20 minutes, and the frozen body is fired at a temperature of from 1400° F. to 1600° F. for a period of from 1 hour to 2 hours.

5. A method as claimed in claim 1 including the step of drying the frozen body at a temperature of from 200° F. to 500° F. prior to firing.

6. A method as claimed in claim 1 wherein a quantity of the slurry is maintained in contact with a refrigerated pattern until the portion of the slurry next to the pattern is frozen to a predtermined thickness, whereupon the unfrozen portion of the slurry is poured off the pattern.

7. A method as claimed in claim 1 wherein a pattern box is filled with the slurry, a portion of the slurry next to the pattern is frozen by refrigerating the pattern, and the unfrozen portion of the slurry is then poured off.

8. A method of making a refractory mold comprising the steps of forming a flowable slurry consisting of a freeze-sensitive aqueous colloidal silica sol and a powdered refractory material, pouring the slurry into a flask containing a pattern having a surface of predetermined shape, refrigerating the slurry to form at least that portion thereof which is in contact with said surface into a frozen body, removing the pattern from the frozen body, and firing the still frozen body without submission to thawing conditions to produce a refractory mold having a surface of said predetermined shape.

9. A method of making a refractory mold comprising the steps of forming a flowable slurry consisting of a freeze-sensitive aqueous colloidal silica sol and a powdered refractory material, pouring the slurry over a refrigerated pattern having a surface of predetermined shape, maintaining the slurry in contact with the pattern until at least that portion of the slurry in contact with said surface is formed into a frozen body, separating the frozen body from the pattern, and firing the still frozen body without submission to thawing conditions to produce a refractory mold having a surface of said predetermined shape.

10. A refractory article for foundry use consisting of a permeable body of refractory particles bonded together by the freeze precipitated silica of a colloidal silica sol.

11. A porous refractory article for foundry use produced according to the method of claim 1.

References Cited

UNITED STATES PATENTS

| | | | |
|---|---|---|---|
| 2,820,268 | 1/1958 | Kohl | 164—41 X |
| 2,765,512 | 10/1956 | Nesbit | 33—207 |
| 2,869,215 | 1/1959 | Smith | 264—28 |
| 3,177,161 | 4/1965 | Smith-Johannsen | 252—502 |
| 2,476,726 | 7/1949 | Haas | 164—37 |

J. SPENCER OVERHOLSER, Primary Examiner

V. K. RISING, Assistant Examiner

U.S. Cl. X.R.

164—34; 264—63